United States Patent
Bang (10) Patent No.: US 9,855,953 B2
(45) Date of Patent: Jan. 2, 2018

(54) SHIFT CONTROL METHOD OF AUTOMATIC TRANSMISSION AND SHIFT CONTROL APPARATUS USING THE METHOD

(71) Applicant: Hyundai Motor Company, Seoul (KR)

(72) Inventor: Jae Sung Bang, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 93 days.

(21) Appl. No.: 14/755,386

(22) Filed: Jun. 30, 2015

(65) Prior Publication Data

US 2016/0137205 A1 May 19, 2016

(30) Foreign Application Priority Data

Nov. 19, 2014 (KR) .................. 10-2014-0161871

(51) Int. Cl.
*B60W 30/19* (2012.01)
*F16H 63/50* (2006.01)
(Continued)

(52) U.S. Cl.
CPC .............. *B60W 30/19* (2013.01); *B60K 6/48* (2013.01); *B60W 10/06* (2013.01); *B60W 10/08* (2013.01);
(Continued)

(58) Field of Classification Search
CPC B60W 30/19; F16H 63/502; F16H 2059/366; F16H 2061/0477
See application file for complete search history.

(56) References Cited

U.S. PATENT DOCUMENTS 6,007,458 A * 12/1999 Ohashi .................. F16H 61/061
477/143
6,832,978 B2 * 12/2004 Buchanan ............. B60W 10/02
477/174
(Continued)

FOREIGN PATENT DOCUMENTS

JP 2003-212003 A 7/2003
JP 2010-215040 A 9/2010
(Continued)

*Primary Examiner* — Tisha Lewis
(74) *Attorney, Agent, or Firm* — Morgan, Lewis & Bockius LLP (57) ABSTRACT

A shift control method of an automatic transmission may include determining, by a controller, whether a shift condition is satisfied, beginning, by the controller, release of an off-going element and engagement of an on-coming element when the shift condition is satisfied, determining, by the controller, whether a speed control entry condition is satisfied while performing the release of the off-going element and the engagement of the on-coming element, determining, by the controller, a target speed of a torque source when the speed control entry condition is satisfied, performing, by the controller, speed control of the torque source using the target speed of the torque source, determining, by the controller, whether a speed control completion condition is satisfied while performing the speed control, and completing, by the controller, the release of the off-going element and the engagement of the on-coming element when the speed control completion condition is satisfied.

20 Claims, 9 Drawing Sheets

(51) Int. Cl.
<table>
<tr><td>B60W 10/06</td><td>(2006.01)</td></tr>
<tr><td>B60W 10/11</td><td>(2012.01)</td></tr>
<tr><td>B60K 6/48</td><td>(2007.10)</td></tr>
<tr><td>B60W 10/08</td><td>(2006.01)</td></tr>
<tr><td>B60W 20/00</td><td>(2016.01)</td></tr>
<tr><td>F16H 61/04</td><td>(2006.01)</td></tr>
<tr><td>F16H 59/36</td><td>(2006.01)</td></tr>
</table>

(52) U.S. Cl.
CPC ............ *B60W 10/11* (2013.01); *B60W 20/00* (2013.01); *F16H 61/0403* (2013.01); *F16H 63/502* (2013.01); *B60K 2006/4825* (2013.01); *F16H 2059/366* (2013.01); *Y02T 10/6221* (2013.01); *Y02T 10/6252* (2013.01); *Y02T 10/6286* (2013.01)

(56) References Cited

U.S. PATENT DOCUMENTS

| | | | | |
|---|---|---|---|---|
| 2005/0060077 A1* | 3/2005 | Slayton | ................ | B60W 10/06 701/51 |
| 2007/0225115 A1* | 9/2007 | Nakajima | ............. | B60W 10/06 477/107 |
| 2013/0296117 A1* | 11/2013 | Shelton | .................... | B60K 6/48 477/5 |
| 2015/0283996 A1* | 10/2015 | Wang | .................... | B60K 6/547 477/3 |

FOREIGN PATENT DOCUMENTS

| | | |
|---|---|---|
| JP | 2011-36072 A | 2/2011 |
| JP | 5190720 B2 | 2/2013 |
| KR | 10-0980966 B1 | 9/2010 |

* cited by examiner

Down-shift
( j = i-k, k>1 )

FIG. 8B

SHIFT CONTROL METHOD OF AUTOMATIC TRANSMISSION AND SHIFT CONTROL APPARATUS USING THE METHOD

CROSS-REFERENCE TO RELATED APPLICATION

The present application claims priority to and the benefit of Korean Patent Application No. 10-2014-0161871 filed Nov. 19, 2014, the entire contents of which is incorporated herein for all purposes by this reference.

BACKGROUND OF THE INVENTION

Field of the Invention

The present invention relates to a shift control method of an automatic transmission and a shift control apparatus using the aforementioned method.

Description of Related Art

An automatic transmission changes gear ratios according to a running state of a vehicle in order to perform shifting to a target gear stage.

In a case in which the shifting to the target gear stage is performed, an automatic transmission has an off-going element that changes from an engaged state to a release state and an on-coming element that changes from a released state to an engaged state. Releasing an off-going element and engaging an on-coming element is realized by controlling hydraulic pressure supplied to respective elements. In addition, the control of the hydraulic pressure supplied to the off-going and on-coming elements is performed by operating a control duty and controlling the solenoid valve according to the control duty.

In general, in a case in which shifting is performed according to the conventional shift control method, slips of an off-going element and an on-coming element are used in order to synchronize a speed of an input shaft and a speed of an output shaft of an automatic transmission. However, in the method in which the speed of the input shaft and the speed of the output shaft are passively synchronized by the slips, shifting time is lengthened and shift quality may be deteriorated according to running conditions (e.g., a slope of a road and a vehicle load). To solve this problem, calibration maps that correspond to each running condition may be prepared previously, but it is impossible to infinitely increase the number of calibration maps. In addition, it is difficult to expect good shift quality in a running condition that is not considered. Further, since a torque converter is not generally used in a hybrid vehicle in order to improve fuel efficiency, bad shift quality may adversely affect vehicle drivability.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a shift control method of an automatic transmission and a shift control apparatus using the method having advantages of realizing smooth shifting by synchronizing input shaft speed with output shaft speed of the automatic transmission based on speed control of a torque source.

According to various aspects of the present invention, a shift control method of an automatic transmission may include determining, by a controller, whether a shift condition is satisfied, beginning, by the controller, release of an off-going element and engagement of an on-coming element when the shift condition is satisfied, determining, by the controller, whether a speed control entry condition is satisfied while performing the release of the off-going element and the engagement of the on-coming element, determining, by the controller, a target speed of a torque source when the speed control entry condition is satisfied, performing, by the controller, speed control of the torque source using the target speed of the torque source, determining, by the controller, whether a speed control completion condition is satisfied while performing the speed control, and completing, by the controller, the release of the off-going element and the engagement of the on-coming element when the speed control completion condition is satisfied.

The speed control entry condition may be satisfied when an equation of $|W_{TS}-W_O \times R_{i\text{-}th}| \geq W_1$ is satisfied, in which the WTS is a speed of the torque source, WO is an output shaft speed of the automatic transmission, Ri-th is a gear ratio at a current gear stage, and W1 is a first preset value.

The shift control method of claim may further include, when the speed control entry condition is satisfied, controlling, by the controller, the off-going element to maintain a standby state and controlling, by the controller, the on-coming element to maintain a standby state.

The determining the target speed of the torque source may include determining an input shaft speed at a target gear stage at a time at which the speed control entry condition is satisfied based on an output shaft speed of the automatic transmission, determining an initial offset based on the input shaft speed at the target gear stage and a speed of the torque source at the time at which the speed control entry condition is satisfied, dividing the initial offset to generate an offset input, and interpolating the offset input to generate interpolated offset input.

The initial offset to generate the offset input may include dividing a range from 0 to the initial offset into a plurality of sub-ranges, determining a slope corresponding to the respective sub-ranges, and generating the offset input which is changed with the determined slope.

The dividing the initial offset to generate the offset input may include determining a first value corresponding to a first preset ratio of the initial offset, determining a second value corresponding to a second preset ratio of the initial offset, generating the offset input which is changed with a first slope until the offset input reaches from 0 to the first value, when the offset input reaches the first value, generating the offset input which is changed with a second slope until the offset input reaches from the first value to the second value, and when the offset input reaches the second value, generating the offset input which is changed with a third slope until the offset input reaches from the second value to the initial offset.

The first slope may be determined by taking into consideration a slope of the speed of the torque source at the time at which the speed control entry condition is satisfied.

The second slope may be determined by taking into consideration the first slope among values satisfying an equation of $$\Delta_2 \leq \frac{MaxTQ}{J},$$

in which the Δ2 is the second slope, the MaxTQ is maximum torque that the torque source outputs in a current running state, and the J is inertia of the input shaft of the automatic transmission.

The third slope may be determined by taking into consideration the second slope and a slope of the output shaft speed of the transmission.

The initial offset to generate the offset input may include determining a target time at which shifting is completed based on the initial offset, dividing an interval from the time at which the speed control entry condition is satisfied to the target time into a plurality of sub-intervals, determining a slope corresponding to the respective sub-intervals, and generating the offset input which is changed with the determined slope.

The plurality of sub-intervals may include a first sub-interval, a second sub-interval, and a third sub-interval, and a first slope corresponding to the first sub-interval may be determined by taking into consideration a slope of the speed of the torque source at the time at which the speed control condition is satisfied.

A second slope corresponding to the second sub-interval may be determined by taking into consideration the first slope among values satisfying an equation of $$\Delta_2 \leq \frac{MaxTQ}{J},$$

in which the Δ2 is the second slope, the MaxTQ is maximum torque that the torque source outputs in a current running state, and the J is inertia of the input shaft of the automatic transmission.

A third slope corresponding to the third sub-interval may be determined by taking into consideration the second slope and a slope of the output shaft speed of the transmission.

The determining the target speed of the torque source may further include determining a difference between the input shaft speed at the target gear stage and the initial offset, and adding the interpolated offset input to the difference between the input shaft speed at the target gear stage and the initial offset.

The performing the speed control of the torque source using the target speed of the torque source may include determining a difference between the target speed of the torque source and a current speed of the torque source, determining feedback control input using the difference between the target speed of the torque source and the current speed of the torque source, determining feed-forward input using inertia of an input shaft of the automatic transmission and the target speed of the torque source, determining disturbance control input using a nominal inverse model of the torque source and at least one low pass filter based on the current speed of the torque source, and determining a torque command using the feedback control input, the feed-forward control input, and the disturbance control input.

The nominal inverse model may be designed to satisfy an equation of $G_n^{-1}(s)=J\times s$, in which the $G_n^{-1}(s)$ the nominal inverse model, the J is the inertia of the input shaft of the automatic transmission and wherein the s is a Laplace transformation operator.

The low pass filter may be designed to satisfy an equation of $$Q(s) = \frac{\sum_{g=1}^{m} b_g s^g}{\sum_{h=1}^{n} a_h s^h},$$

in which the Q(s) is the low pass filter, n is greater than or equal to m, and ah and bg are design parameters and designed to satisfy an equation of $|Q(s=jw)|_{w \leq w_m} \approx 1$ at a maximum frequency wm or lower included in the disturbance and wherein the s is a Laplace transformation operator.

The speed control completion condition may be satisfied when an equation of $|W_{TS}-W_O \times R_{j-th}| \leq W_2$ is satisfied, in which the WTS is a speed of the torque source, WO is an output shaft speed of the automatic transmission, Rj-th is a gear ratio at a target gear stage, and W2 is a second preset value.

The speed control completion condition may be satisfied when an equation of $|W_{TS}-W_O \times R_{j-th}| \leq W_2$ and an equation of $$\frac{d}{dt}(|W_{rs} - W_o \times R_{j-th}|) \leq W_3$$

are simultaneously satisfied, in which the WTS is a speed of the torque source, WO is an output shaft speed of the automatic transmission, Rj-th is a gear ratio at a target gear stage, W2 is a second preset value, and W3 is a third preset value.

According to various aspects of the present invention, a shift control apparatus of an automatic transmission may include a data detector configured to detect data for a shift control, a torque source configured to generate torque for operating a vehicle, a controller executed by a predetermined program to control shifting based on the data, and an actuator configured to receive a control signal from the controller and configured to control hydraulic pressures applied to respective frictional elements of the automatic transmission, in which the predetermined program comprises a series of commands for performing a shift control method of the automatic transmission and the method includes determining, by the controller, whether a shift condition is satisfied, beginning, by the controller, release of an off-going element and engagement of an on-coming element when the shift condition is satisfied, determining, by the controller, whether a speed control entry condition is satisfied while performing the release of the off-going element and the engagement of the on-coming element, determining, by the controller, target speed of the torque source when the speed control entry condition is satisfied, performing, by the controller, speed control of the torque source using the target speed of the torque source, determining, by the controller, whether a speed control completion condition is satisfied while performing the speed control, and completing, by the controller, the release of the off-going element and the engagement of the on-coming element when the speed control completion condition is satisfied.

According to various embodiment of the present invention, smooth shifting can be realized by synchronizing the input shaft speed with the output shaft speed based on speed control of the torque source. In addition, unlike in the conventional passive shift method using slips of frictional elements, active shifting can be realized by using the speed control of the torque source, thereby reducing shifting time and energy loss due to the slips, and thus fuel consumption can be improved.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
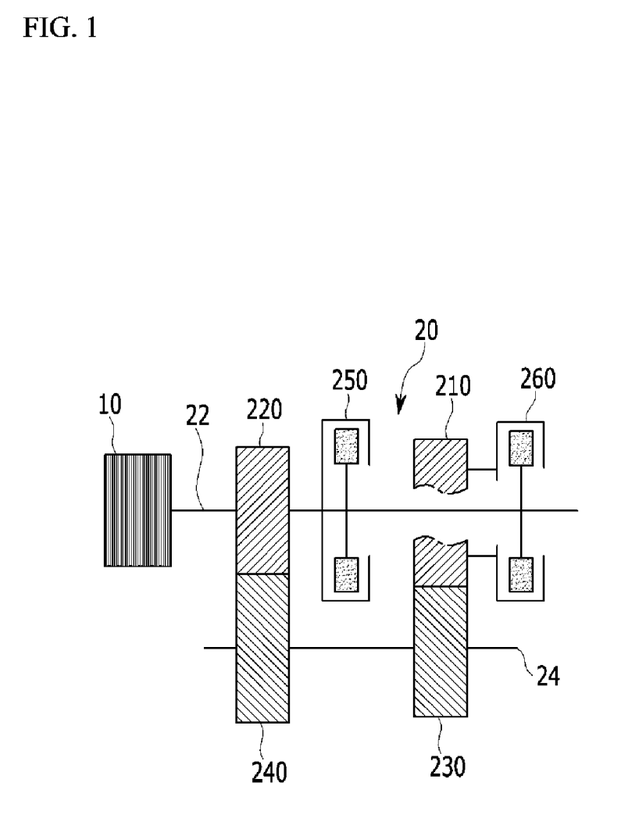
FIG. 1 is a diagram of an automatic transmission to which an exemplary shift control method is applied according to the present invention.

FIG. 1 is a schematic diagram of an automatic transmission to which a shift control method is applied according to various embodiments of the present invention.

As shown in FIG. 1, an automatic transmission 20 to which a shift control method is applied according to various embodiments of the present invention receives torque from an input shaft 22 connected to a torque source 10 and transmits the torque to an output shaft 24. In addition, at least one planetary gear set is interposed between the input shaft 22 and the output shaft 24 such that a speed of the input shaft 22 is changed to a target speed and the target speed is transmitted to the output shaft 24. Further, at least one frictional element that selectively connects respective operational members of the planetary gear set with the input shaft 22, a transmission case, or another operational member is disposed in the automatic transmission. For better comprehension and ease of description, only first and second drive gears 210 and 220, first and second driven gears 230 and 240, and first and second frictional elements 250 and 260 are represented in FIG. 1.

The first drive gear 210 is disposed on the input shaft 22, and achieves a first gear stage by operation of the first frictional element 250. The first drive gear 210 is engaged with the first driven gear 230.

The second drive gear 220 is disposed on the input shaft 22, and achieves a second gear stage by operation of the second frictional element 260. The second drive gear 220 is engaged with the second driven gear 240.

Shifting from the first gear stage to the second gear stage is realized by changing the first frictional element 250 (off-going element) from an engaged state to a released state and simultaneously changing the second frictional element 260 (on-coming element) from a released state to an engaged state.

The above-described automatic transmission 20 is an example to which the spirit of the present invention can be applied, and the spirit of the present invention is applied not only to the automatic transmission shown in FIG. 1, but also to any automatic transmissions where shifting is performed by engagement of one on-coming element and release of one off-going element.

Figure 2:
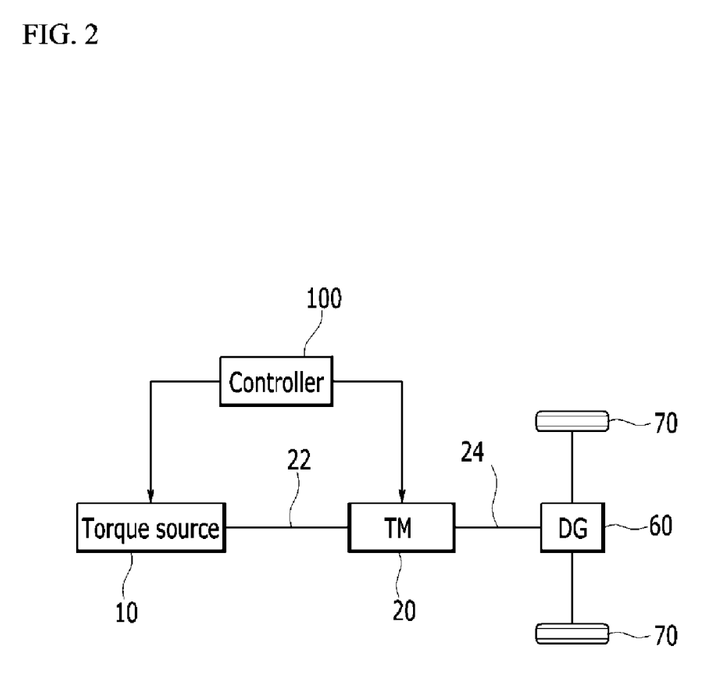
FIG. 2 is a diagram of a vehicle to which an exemplary shift control apparatus of an automatic transmission according to the present invention is applied.

FIG. 2 is a diagram of a vehicle to which a shift control apparatus of an automatic transmission according to various embodiments of the present invention is applied.

As shown in FIG. 2, a vehicle to which a shift control apparatus of an automatic transmission is applied according to various embodiments of the present invention may include a torque source 10, an automatic transmission 20, a differential gear device 60, a wheel 70, and a controller 100.

The torque source 10 generates torque for operating the vehicle. In a case of an internal combustion engine vehicle driven by torque of an engine, the torque source 10 may only include the engine. In a case of a hybrid vehicle driven by torques of an engine and a motor, the torque source 10 may include the engine and the motor (see FIG. 3). In a case of an electric vehicle or a fuel cell vehicle driven by torque of a motor, the torque source 10 may only include the motor.

In connection with torque transmission of the vehicle according to various embodiments of the present invention, torque generated from the torque source 10 is transmitted to an input shaft 22 of the automatic transmission 20, and torque output from an output shaft 24 of the automatic transmission 20 is transmitted to an axle via the differential gear device 60. The axle rotates the wheel 70 so that the vehicle runs by the torque generated from the torque source 10.

Figure 3:
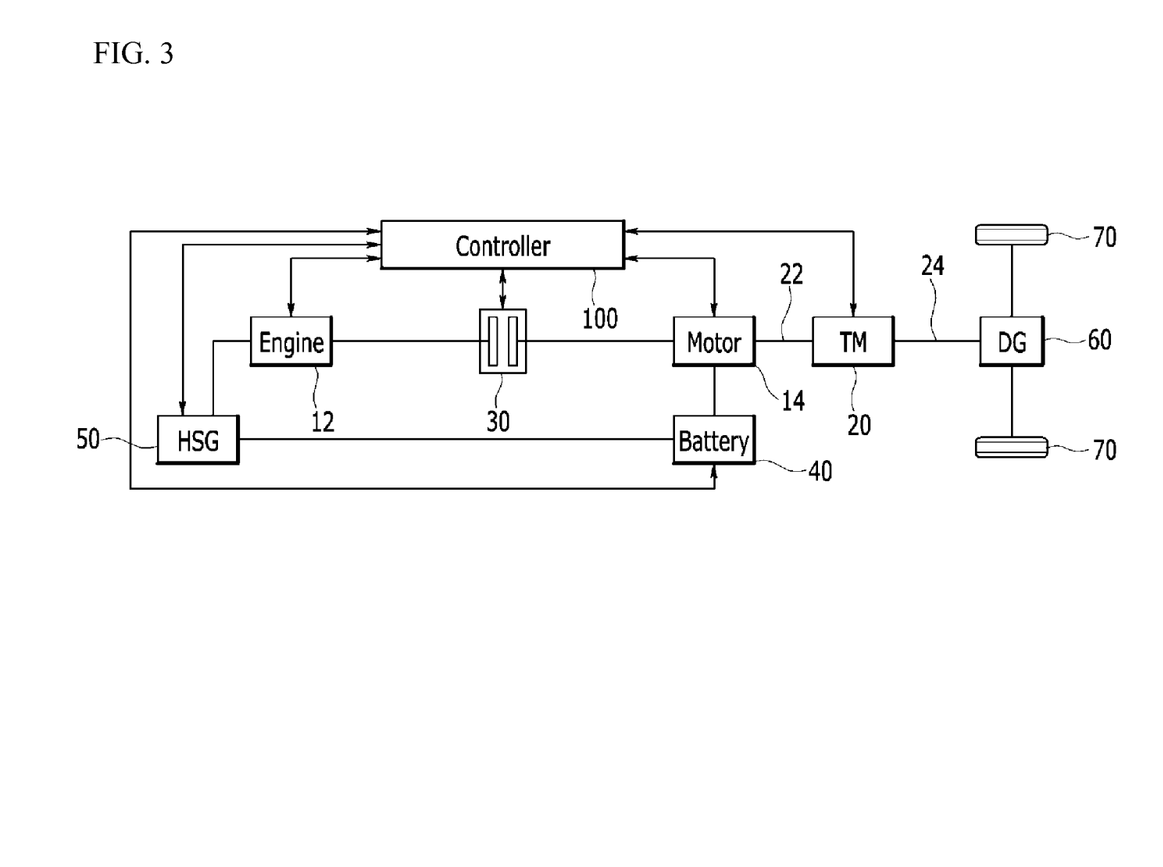
FIG. 3 is a diagram of a hybrid vehicle to which an exemplary shift control apparatus of an automatic transmission is applied according to the present invention.

FIG. 3 is a diagram of a hybrid vehicle to which a shift control apparatus of an automatic transmission is applied according to various embodiments of the present invention.

As shown in FIG. 3, a hybrid vehicle to which a shift control apparatus of an automatic transmission is applied according to various embodiments of the present invention may include an engine 12, a motor 14, an engine clutch 30 controlling torque between the engine 12 and the motor 14, an automatic transmission 20, a battery 40, a hybrid starter & generator (HSG) 50, a differential gear device 60, wheels 70, and a controller 100.

The hybrid vehicle provides driving in an electric vehicle (EV) mode in which torque of the motor is used by coupling or decoupling the engine clutch 30 depending on acceleration or deceleration intention based on a manipulation of an accelerator pedal and a brake pedal by a driver, a vehicle speed, a state of charge (SOC) of the battery 40, and the like; a hybrid electric vehicle (HEV) mode in which torque of the engine 10 is used as main power and torque of the motor 14 is used as auxiliary power; and a regenerative braking mode in which braking and inertial energy are recovered through electrical power generation of the motor 14 during braking the vehicle or during driving the vehicle by inertia to be charged in the battery 40.

The engine 10 combusts a fuel to generate power, and various engines such as a gasoline engine, a diesel engine, and an LPI engine may be used as the engine.

In connection with torque transmission of the hybrid vehicle, torque generated from the engine 10 and the motor 14 is selectively transmitted to an input shaft 22 of the automatic transmission 20, and torque output from an output shaft 24 of the automatic transmission 20 is transmitted to an axle via the differential gear device 60. The axle rotates the wheel 70 so that the hybrid vehicle runs by the torque generated from the engine 10 and/or the motor 14.

The battery 40 may supply electricity to the motor 14 in the EV mode and the HEV mode, and may be charged with electricity recovered thorough the motor 14 in the regenerative braking mode.

The HSG 50 starts the engine 12 or generates electricity according to an output of the engine 12.

The controller 100 controls torque of the engine 12 and torque of the motor 14 according to driving conditions of the hybrid vehicle, and controls switching between the EV mode and the HEV mode.

Figure 4:
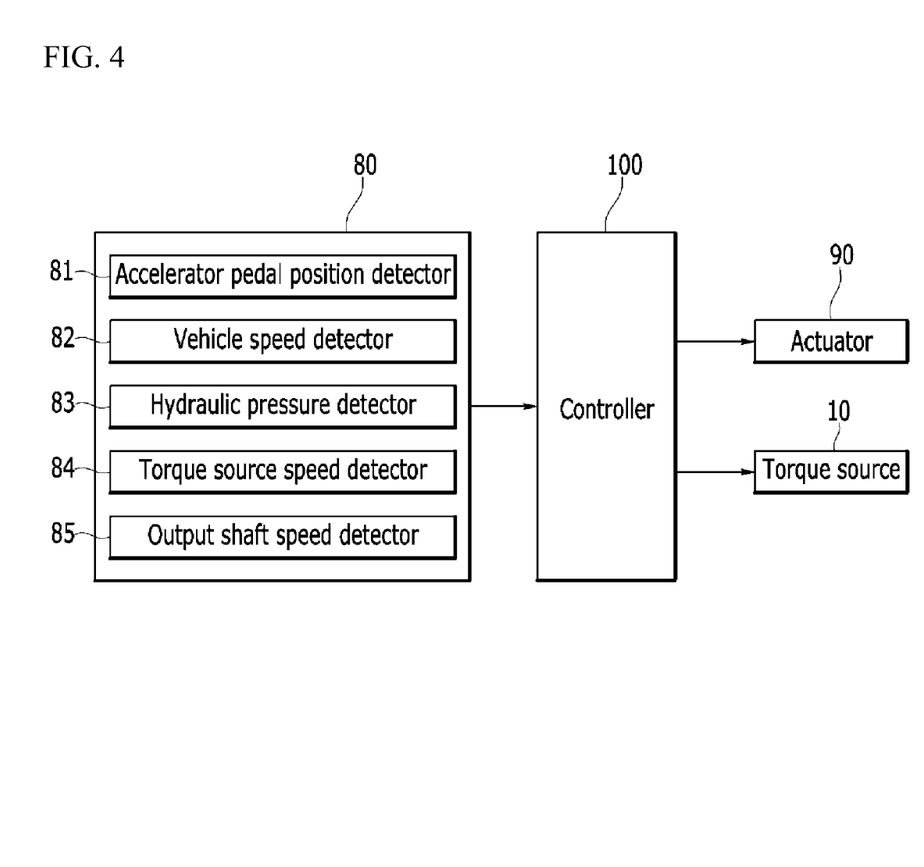
FIG. 4 is a block diagram of an exemplary shift control apparatus of an automatic transmission according to the present invention.

FIG. 4 is a block diagram of a shift control apparatus of an automatic transmission according to various embodiments of the present invention.

As shown in FIG. 4, a shift control apparatus of an automatic transmission according to various embodiments of the present invention may include a data detector 80, a controller 100, an actuator 90, and a torque source 10.

The data detector 80 detects data for a shift control, and the data detected from the data detector 80 is transmitted to the controller 100.

The data detector 80 may include an accelerator pedal position detector 81, a vehicle speed detector 82, a hydraulic pressure detector 83, a torque source speed detector 84, and an output shaft speed detector 85.

The accelerator pedal position detector 81 detects a position value of an accelerator pedal (pushed degree of the accelerator pedal) and transmits a signal corresponding thereto to the controller 100. When the accelerator pedal is pushed completely, the position value of the accelerator pedal is 100%. When the accelerator pedal is not pushed, the position value of the accelerator pedal is 0%.

The vehicle speed detector 82 detects a vehicle speed and transmits a signal corresponding thereto to the controller 100. The vehicle speed detector 82 may be mounted at the wheel 70.

The hydraulic pressure detector 83 detects hydraulic pressures applied to respective frictional elements, and transmits a signal corresponding thereto to the controller 100.

The torque source speed detector 84 detects a speed of the torque source 10, and transmits a signal corresponding thereto to the controller 100.

The output shaft speed detector 85 detects a speed of the output shaft 24 of the automatic transmission 20, and transmits a signal corresponding thereto to the controller 100.

In the present specification and the claims, a speed of the input shaft 22 of the automatic transmission 20 will be referred to as "input shaft speed", and a speed of the output shaft 24 of the automatic transmission 20 will be referred to as "output shaft speed".

The controller 100 may be implemented with one or more microprocessors executed by a predetermined program. The predetermined program may include a series of commands for performing each step included in a shift control method of the automatic transmission 20 according to various embodiments of the present invention to be described below.

The actuator 90 receives a control signal from the controller 100 and controls hydraulic pressures applied to respective frictional elements of the automatic transmission 20. The actuator 90 may include at least one of control valves and solenoid valves that control hydraulic pressures applied to respective frictional elements.

The controller 100 performs a shift control method by controlling speed of the torque source 10 based on data received from the data detector 80.

Hereinafter, a shift control method of an automatic transmission according to various embodiments of the present invention will be described in detail with reference to FIG. 5 to FIG. 8.

Hereinafter, a down-shift control method realized by release of one off-going element and engagement of one on-coming element will be mainly described. In addition, the technical spirit of the present invention may be applied to a case of a skip shift where three speed steps are shifted by release of one off-going element and engagement of one on-coming element. Further, the technical spirit of the present invention may be applied to a case of a specific skip shift realized by releases of two off-going elements and engagements of two on-coming elements. Since an up-shift control method is similar to the down-shift control method, a detailed description of description will be omitted.

Figure 5:
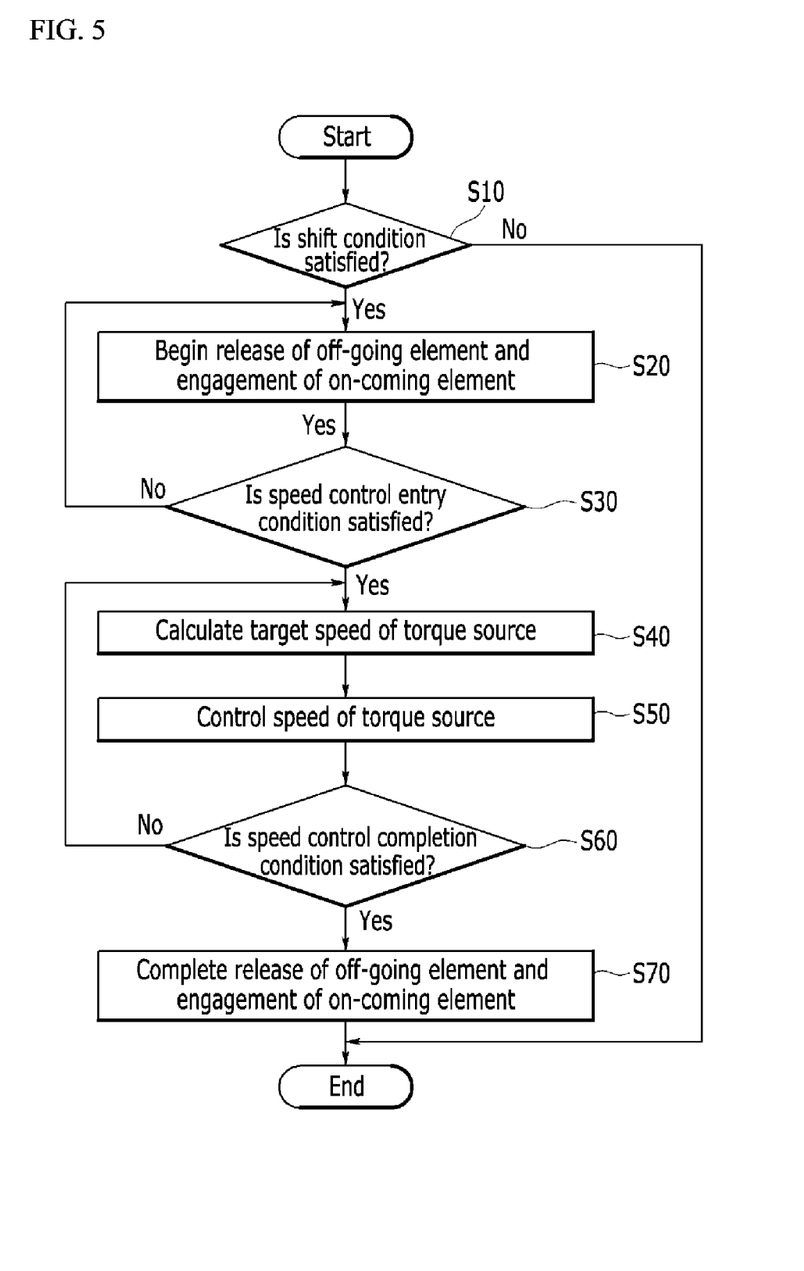
FIG. 5 is a flowchart of an exemplary shift control method of an automatic transmission according to the present invention.
Figure 6:
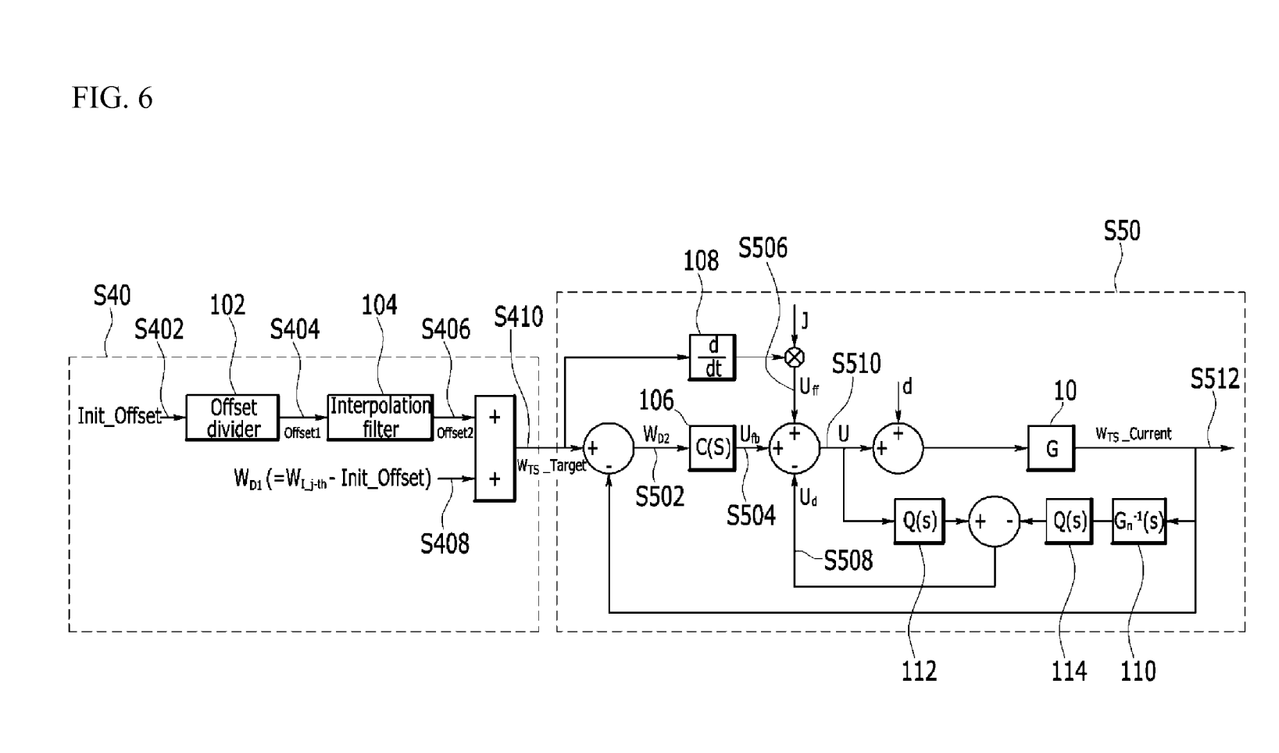
FIG. 6 is a flowchart of a method for controlling speed of a torque source according to the present invention.
Figure 7:
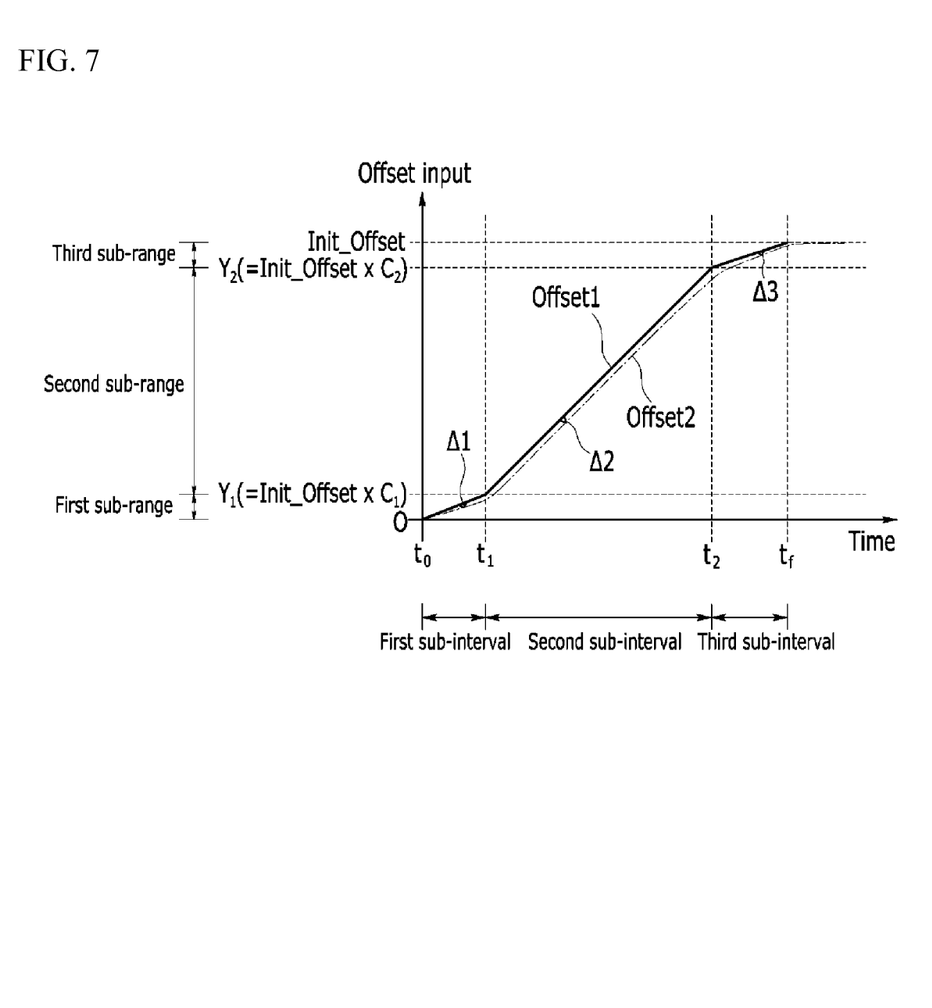
FIG. 7 is a graph for explaining generation of offset input according to the present invention.
Figure 8A:
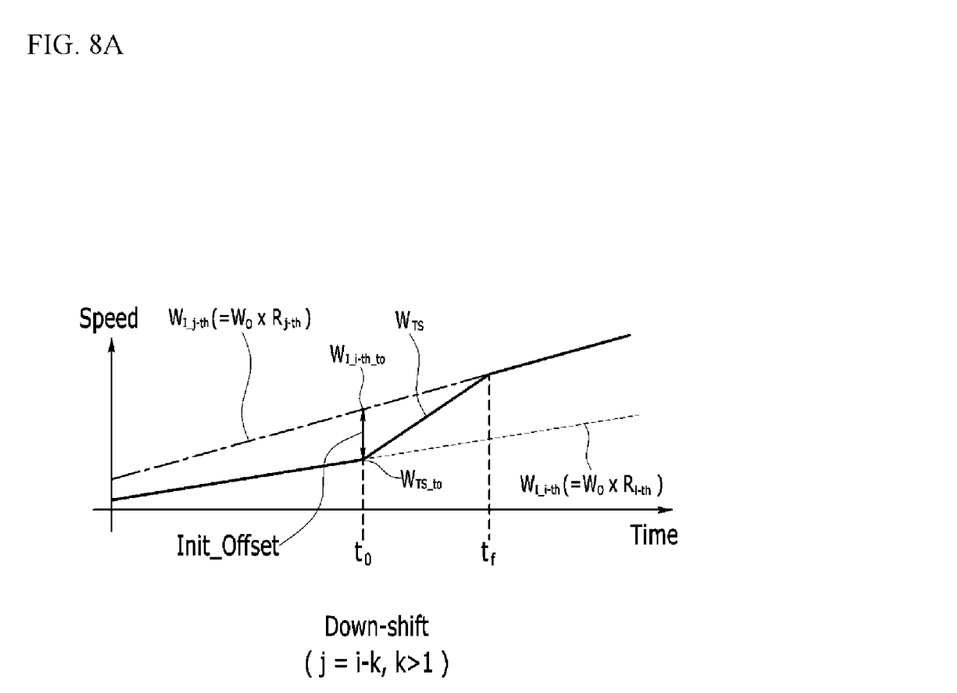
FIG. 8A and FIG. 8B are graphs for explaining an exemplary shift control method of an automatic transmission according to the present invention.
Figure 8B:
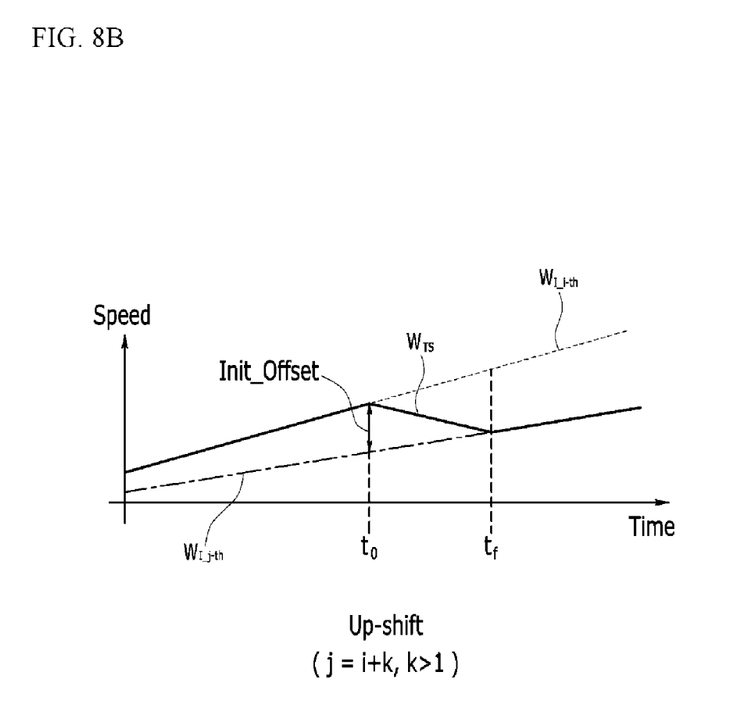

FIG. 5 is a flowchart of a shift control method of an automatic transmission according to various embodiments of the present invention, FIG. 6 is a flowchart of a method for controlling speed of a torque source according to various embodiments of the present invention, FIG. 7 a graph for explaining generation of offset input according to various embodiments of the present invention, and FIG. 8A is a graph for explaining a down-shift control method according to various embodiments of the present invention.

Referring FIG. 5 to FIG. 8A, a shift control method of an automatic transmission according to various embodiments of the present invention begins with determining whether a shift condition is satisfied at step S10. That is, the controller 100 determines whether shifting from a current gear stage (i-th gear stage) to a target gear stage (j-th gear stage) is required. The controller 100 may determine whether the shift condition is satisfied based on the position value of the accelerator pedal received from the accelerator pedal position detector 81 and the vehicle speed received from the vehicle speed detector 82.

If the shift condition is not satisfied at step S10, the controller 100 finishes the shift control method of the automatic transmission according to various embodiments of the present invention. That is, the vehicle continues to be driven in the current gear stage.

If the shift condition is satisfied at step the S10, the controller 100 begins release of the off-going element and engagement of the on-coming element at step S20. Here, the beginning the release of the off-going element and the engagement of the on-coming element means that hydraulic pressure of each frictional element is started to be controlled. That is, the beginning of the release of the off-going element means that the hydraulic pressure applied to the off-going element is reduced gradually or quickly, and the beginning of the engagement of the on-coming element means that the hydraulic pressure of the on-coming element is increased gradually or quickly.

While performing the release of the off-going element and the engagement of the on-coming element, the controller 100 determines whether a speed control entry condition is satisfied at step S30. The speed control entry condition may be satisfied if a following Equation 1 is satisfied.

$$|W_{TS} - W_O \times R_{i\text{-}th}| \geq W_1 \qquad \text{[Equation 1]}$$

Herein, the $W_{TS}$ is a speed of the torque source 10, $W_O$ is an output shaft speed, $R_{i\text{-}th}$ is a gear ratio at the current gear stage, and $W_1$ is a first preset value. The first preset value $W_1$ may be set by a person of ordinary skill in the art according to vehicle and types of the torque source 10 that are applicable to a shift control method of an automatic transmission according to various embodiments of the present invention.

If the speed control entry condition is not satisfied at step S30, the controller 100 continuously performs the release of the off-going element and the engagement of the on-coming element.

If the speed control entry condition is satisfied at step S30, the controller 100 calculates a target speed $W_{TS\_target}$ of the torque source 10 at step S40. In this case, the controller 100 may control the off-going element to maintain its standby state, and control the on-coming element to maintain its standby state. That is, hydraulic pressures applied to the off-going element and the on-coming element may be maintained at standby pressures.

Hereinafter, a process of generating a target speed profile of the torque source 10 will be described in detail.

Hereinafter, a time at which the speed control entry condition is satisfied refers to an initial time $t_0$.

The controller 100 may calculate an input shaft speed $W_{I\_i\text{-}th}$ at a current gear stage and an output shaft speed $W_{I\_j\text{-}th}$ at a target gear stage based on an output shaft speed $W_O$. In detail, the controller 100 may calculate the input shaft speed $W_{I\_i\text{-}th}$ at the current gear stage by multiplying the output shaft speed $W_O$ and a gear ratio $R_{i\text{-}th}$ at the current gear stage, and may calculate the input shaft speed $W_{I\_j\text{-}th}$ at the target gear stage by multiplying the output shaft speed $W_O$ and a gear ratio $R_{j\text{-}ith}$ at the target gear stage.

The controller 100 calculates an initial offset Init_Offset based on an output shaft speed $W_{O\_t0}$ and a speed $W_{TS\_t0}$ of the torque source 10 at the initial time $t_0$ at step S402. In detail, the controller 100 may calculate an input shaft speed $W_{I\_j\text{-}th\_t0}$ at the target gear stage at the initial time $t_0$ using the output shaft speed $W_{O\_t0}$. The initial offset Init_Offset is a value obtained by subtracting the speed $W_{TS\_t0}$ of the torque source 10 from the input shaft speed $W_{I\_j\text{-}th\_t0}$.

The controller 100 may generate the target speed profile of the torque source 10 using the initial offset Init_Offset and the input shaft speed $W_{I\_j\text{-}th}$ at the target gear stage.

The controller 100 may include an offset divider 102 and an interpolation filter 104. The controller 100 may divide the initial offset Init_Offset to generate an offset input Offset1 at step S404. In addition, the controller 100 may interpolate the offset input Offset1 to generate an interpolated offset input Offset2 at step S406.

Hereinafter, a process of generating the offset inputs Offset1 and Offset2 will be described with reference to FIG. 7.

The controller 100 may divide the initial offset Init_Offset to generate the offset input Offset1 in two schemes as follows.

Method of dividing a range from 0 to the initial offset Init_Offset

The controller 100 may divide the range from 0 to the initial offset Init_Offset into a plurality of sub-ranges. FIG. 7 illustrates that the range from 0 to the initial offset Init_Offset into three sub-ranges, but the present invention is not limited thereto. A case of dividing the range from 0 to the initial offset Init_Offset into more or less sub-ranges is applicable to the technical spirit of the present invention.

The controller 100 may determine a slope corresponding to each sub-range, and may generate the offset input Offset1 which is changed with the determined slope.

For example, the controller 100 may calculate a first value $Y_1$ corresponding to a first preset ratio $c_1$ of the initial offset Init_Offset and a second value $Y_2$ corresponding to a second preset ratio $c_2$ of the initial offset Init_Offset.

The controller 100 may generate the offset input Offset1 which is changed with a first slope $\Delta_1$ until the offset input Offset1 reaches from 0 to the first value $Y_1$. The first slope $\Delta_1$ may be determined by taking into consideration a slope of the speed of the torque source 10 before the initial time $t_0$. That is, the first slope $\Delta_1$ may be determined in order to prevent overshoot of the speed of the torque source 10 before and after the initial time $t_0$.

If the offset input Offset1 reaches the first value $Y_1$, the controller 100 generates offset input Offset1 which is changed with a second slope $\Delta_2$ until the offset input Offset1 reaches from the first value $Y_1$ to the second value $Y_2$. The second slope $\Delta_2$ may be determined by taking into consideration the first slope $\Delta_1$ among values satisfying a following Equation 2.

$$\Delta_2 \leq \frac{MaxTQ}{J} \qquad \text{[Equation 2]}$$

Herein, the MaxTQ is maximum torque that the torque source 10 may output in a current running state, and the J is inertia of the input shaft 22 of the automatic transmission 20 (precisely, entire inertia from the torque source 10 to the input shaft 22 of the automatic transmission 20). The inertia J may be differently set according to a gear stage that is currently engaged. Further, when the torque source 10 includes the engine 12 and the motor 14 (i.e., in the case of the hybrid vehicle), the inertia J may be differently set according to engagement of the engine clutch 30 (i.e., inertia in the EV mode is different from inertia in the HEV mode). The inertia J may be previously determined by experiments.

If the offset input Offset1 reaches the second value $Y_2$, the controller 100 generates offset input Offset1 which is changed with a third slope $\Delta_3$ until the offset input Offset1 reaches from the second value $Y_2$ to the initial offset Init_Offset. The third slope $\Delta_3$ may be determined by taking into consideration the second slope $\Delta_2$ and a slope of the output shaft speed $W_O$. That is, the third slope $\Delta_3$ may be determined in order to prevent overshoot of the speed of the torque source 10 before and after the shifting is completed.

Accordingly, the offset input Offset1 is generated as a value which is changed as time passes. That is, in the case of down-shift control, the offset input Offset1 is increased as time passes, but in the case of up-shift control, the offset input Offset1 is decreased as time passes.

2) Method determining a target time at which shifting is completed

The controller 100 may determine the target time $t_f$ at which the shifting is completed based on the initial offset Init_Offset. The controller 100 may divide an interval from the initial time $t_0$ to the target time $t_f$ into a plurality of sub-intervals. FIG. 8 illustrates that the interval from the initial time $t_0$ to the target time $t_f$ is divided into three sub-intervals, but the present invention is not limited thereto. A case of dividing the interval from the initial time $t_0$ to the target time $t_f$ into more or less sub-intervals is applicable to a technical spirit of the present invention.

The controller 100 may determine a slope corresponding to each sub-interval, and may generate offset input Offset1 which is changed with the determined slope.

For example, the plurality of sub-intervals may include a first sub-interval, a second sub-interval, and a third sub-interval. The controller 100 may determine a first time $t_1$ and a second time $t_2$ in order to prevent overshoot of speed of the torque source 10 before and after the initial time $t_0$ and the target time $t_f$.

In detail, the controller 100 may determine the first time $t_1$ and the second time $t_2$ using a following Equation 3 and the following Equation 4.

$$\text{Init\_Offset} = \Delta_1 \times (t_1 - t_0) + \Delta_2 \times (t_2 - t_1) + \Delta_3 \times (t_f - t_2) \quad \text{[Equation 3]}$$

$$t_2 = c_3 \times t_1 \quad \text{[Equation 4]}$$

Herein, the $c_3$ may be determined by experiments to have a ratio that a person of ordinary skill in the art determines. Similar to the method of dividing the range from 0 to the initial offset Init_Offset, the controller 100 may determine a first slope $\Delta_1$ corresponding to the first sub-interval, a second slope $\Delta_2$ corresponding to the second sub-interval, and a third slope $\Delta_3$ corresponding to the third sub-interval. That is, the first slope $\Delta_1$ may be determined by taking into consideration a slope of the speed of the torque source 10 before the initial time $t_0$, the second slope $\Delta_2$ may be determined by taking into consideration the first slope $\Delta_1$ among values satisfying Equation 2, and the third slope $\Delta_3$ may be determined by taking into consideration the second slope $\Delta_2$ and the slope of the output shaft speed $W_O$. Since the initial offset Init_Offset, the initial time $t_0$, and the target time $t_f$ are previously determined, the controller 100 may determine the first time $t_1$ and the second time $t_2$ which are two unknown values of Equation 3 and Equation 4.

The controller 100 may generate offset input Offset1 which is changed with the first slope $\Delta_1$ from the initial time $t_0$ to the first time $t_1$, is changed with the second slope $\Delta_2$ from the first time $t_1$ to the second time $t_2$, and is changed with the third slope $\Delta_3$ from the second time $t_2$ to the target time $t_f$.

Accordingly, the offset input Offset1 is generated as a value which is changed as time passes. That is, in the case of down-shift control, the offset input Offset1 is increased as time passes, but in the case of up-shift control, the offset input Offset1 is decreased as time passes.

While the generating of the offset input Offset1, the controller 100 may interpolate the offset input Offset1 through the interpolation filter 104 so that the offset input Offset1 is smoothly changed at step S406. The interpolation filter 104 may include a low pass filter (LPF), but the present invention is not limited thereto. The interpolation filter 104 may use a spline interpolation method.

The controller 100 calculates a difference $W_{D1}$ between the input shaft speed $W_{I\_j-th}$ at the target gear stage and the initial offset Init_offset at step S408.

The controller 100 calculates a target speed $W_{TS\_target}$ of the torque source 10 using the input shaft speed $W_{I\_j-th}$ at the target gear stage and the initial offset Init_offset at step S410. In detail, the controller 100 may add the interpolated offset input Offset2 to the difference $W_{D1}$ to calculate the target speed $W_{TS\_target}$ of the torque source 10.

If the target speed $W_{TS\_target}$ of the torque source 10 is calculated at step S40, the controller 100 performs speed control of the torque source 10 using the target speed $W_{TS\_target}$ at step S50.

The controller 100 calculates a difference $W_{D2}$ between the target speed $W_{TS\_target}$ of the torque source 10 and the current speed $W_{TS\_current}$ of the torque source 10 at step S502.

The controller 100 calculates feedback control input $U_{fb}$ using the difference $W_{D2}$ at step S504. That is, the controller 100 may include a proportional integral derivative (PID) controller 106 which receives the difference $W_{D2}$ to output the feedback control input $U_{fb}$. However, the spirit of the present invention is not limited thereto. That is, a configuration capable of performing feedback control instead of the PID controller 106 is applicable to the technical spirit of the present invention.

The controller 100 may calculate feed-forward control input $U_{ff}$ using inertia J of the input shaft 22 of the automatic transmission 20 and the target speed $W_{TS\_target}$ of the torque source 10 at step S506. That is, the controller 100 may include a differentiator 108 which received the target speed $W_{TS\_target}$ of the torque source 10 to output a differentiation value of the target speed $W_{TS\_target}$. The controller 100 may calculate the feed-forward control input $U_{ff}$ by multiplying the inertia J and the differentiation value.

The controller 100 may include a nominal inverse model 110 of the torque source 10 and at least one of low pass filters 112 and 114 for removing disturbance (i.e., an unknown term) d. The low pass filters Q(s) 112 and 114 may be designed to satisfy a following Equation 5.

$$Q(s) = \frac{\sum_{g=1}^{m} b_g s^g}{\sum_{h=1}^{n} a_h s^h}, \quad \text{[Equation 5]}$$

Herein, n is greater than or equal to m, and $a_h$ and $b_g$ are design parameters and are designed to satisfy a following Equation 6 at a maximum frequency $w_m$ or lower included in the disturbance d and the s is a Laplace transformation operator.

$$|Q(s=jw)|_{w \leq w_m} \approx 1 \quad \text{[Equation 6]}$$

The nominal inverse model $G_n^{-1}(s)$ 110 is designed to satisfy a following Equation 7, wherein the s is a Laplace transformation operator.

$$G_n^{-1}(s) = J \times s \quad \text{[Equation 7]}$$

Herein, the J is inertia of the input shaft 22 of the automatic transmission 20.

That is, a nominal model of the torque source 10 is designed to satisfy a following Equation 8.

$$G_n(s) = \frac{1}{J \times s} \quad \text{[Equation 8]}$$

The controller 100 calculates disturbance control input $U_d$ using the nominal inverse model 110 and the low pass filters 112 and 114 based on current speed $W_{TS\_current}$ of the torque source 10 at step S508.

The controller 100 calculates a torque command U using the feedback control input $U_{fb}$, the feed-forward control input U, and the disturbance control input $U_d$ at step S510.

The torque source 10 generates torque according to the torque command U. If the torque source 10 includes the engine 12 and the motor 14 (i.e., in the case of the hybrid vehicle), the torque command U may be suitably distributed to the engine 12 and the motor 14.

The controller 100 receives the current speed $W_{TS\_current}$ of the torque source 10 from the torque source speed detector 84 at step S512. In the case of down-shift control, speed $W_{TS}$ of the torque source 10 is increased, and in the case of up-shift control, speed $W_{TS}$ of the torque source 10 is decreased.

While performing the speed control of the torque source 10, the controller 100 determines whether a speed control completion condition is satisfied at step S60. The speed control completion condition may be satisfied if a following Equation 9 is satisfied.

$$|W_{TS} - W_O \times R_{j-th}| \leq W_2 \quad \text{[Equation 9]}$$

Herein, the $W_{TS}$ is a speed of the torque source 10, the $W_O$ is an output shaft speed, the $R_{j-th}$ is a gear ratio at the target gear stage, and the $W_2$ is a second preset value. The second preset value $W_2$ may be set by a person of ordinary skill in the art according to vehicle and types of the torque source 10 that are applicable to a shift control method of an automatic transmission according to various embodiments of the present invention.

That is, the controller 100 may complete speed control of the torque source 10 when the input shaft speed is synchronized to the output shaft speed.

Alternatively, the speed control completion condition may be satisfied if the Equation 9 and a following Equation 10 are simultaneously satisfied.

$$\frac{d}{dt}(|W_{rs} - W_o \times R_{j-th}|) \leq W_3 \quad \text{[Equation 10]}$$

Herein, the $W_3$ is a third preset value. The third preset value $W_3$ may be set by a person of ordinary skill in the art according to vehicle and types of the torque source 10 that are applicable to a shift control method of an automatic transmission according to various embodiments of the present invention.

That is, the controller 100 may reduce shift shock as compared with the case of synchronizing the input shaft speed to the output shaft speed by completing speed control of the torque source 10 when the slope of the input shaft speed is synchronized to the slope of the output shaft speed.

If the speed control completion condition is not satisfied at step S60, the controller 100 continuously performs speed control of the torque source 10.

If the speed control completion condition is satisfied at step S60, the controller 100 completes the release of the off-going element and the engagement of the on-coming element. That is, hydraulic pressure applied to the off-going element is reduced to 0, and hydraulic pressure applied to the on-coming element is increased to on-coming pressure.

As described above, according to various embodiments of the present invention, smooth shifting can be realized by synchronizing the input shaft speed with the output shaft speed based on speed control of the torque source 10. In addition, unlike in the conventional passive shift method using slips of frictional elements, active shifting can be realized by using the speed control of the torque source 10, thereby reducing shifting time and energy loss due to the slips, and thus fuel consumption can be improved. Further, since the active shifting is realized by using the speed control of the torque source 10, precise hydraulic pressure control for performing shifting is not required.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shift control method of an automatic transmission, the method comprising:
   determining, by a controller, whether a shift condition is satisfied;
   beginning, by the controller, release of an off-going element and engagement of an on-coming element when the shift condition is satisfied;
   determining, by the controller, whether a speed control entry condition is satisfied while performing the release of the off-going element and the engagement of the on-coming element;
   determining, by the controller, a target speed of a torque source when the speed control entry condition is satisfied;
   performing, by the controller, speed control of the torque source using the target speed of the torque source;
   determining, by the controller, whether a speed control completion condition is satisfied while performing the speed control; and
   completing, by the controller, the release of the off-going element and the engagement of the on-coming element when the speed control completion condition is satisfied.

2. The shift control method of claim 1, wherein the speed control entry condition is satisfied when an equation of $|W_{TS}-W_O \times R_{i\text{-}th}| \geq W_1$ is satisfied,
  wherein the $W_{TS}$ is a speed of the torque source, $W_O$ is an output shaft speed of the automatic transmission, $R_{i\text{-}th}$ is a gear ratio at a current gear stage, and $W_1$ is a first preset value.

3. The shift control method of claim 1, further comprising, when the speed control entry condition is satisfied, controlling, by the controller, the off-going element to maintain a standby state and controlling, by the controller, the on-coming element to maintain a standby state.

4. The shift control method of claim 1, wherein the determining the target speed of the torque source comprises:
  determining an input shaft speed at a target gear stage at a time at which the speed control entry condition is satisfied based on an output shaft speed of the automatic transmission;
  determining an initial offset based on the input shaft speed at the target gear stage and a speed of the torque source at a time at which the speed control entry condition is satisfied;
  dividing the initial offset to generate an offset input; and
  interpolating the offset input to generate interpolated offset input.

5. The shift control method of claim 4, wherein the dividing the initial offset to generate the offset input comprises:
  dividing a range from 0 to the initial offset into a plurality of sub-ranges;
  determining a slope corresponding to the respective sub-ranges; and
  generating the offset input which is changed with the determined slope.

6. The shift control method of claim 4, wherein the dividing the initial offset to generate the offset input comprises:
  determining a first value corresponding to a first preset ratio of the initial offset;
  determining a second value corresponding to a second preset ratio of the initial offset;
  generating the offset input which is changed with a first slope until the offset input reaches from 0 to the first value;
  when the offset input reaches the first value, generating the offset input which is changed with a second slope until the offset input reaches from the first value to the second value; and
  when the offset input reaches the second value, generating the offset input which is changed with a third slope until the offset input reaches from the second value to the initial offset.

7. The shift control method of claim 6, wherein the first slope is determined by taking into consideration a slope of the speed of the torque source at a time at which the speed control entry condition is satisfied.

8. The shift control method of claim 6, wherein the second slope is determined by taking into consideration the first slope among values satisfying an equation of $$\Delta_2 \leq \frac{MaxTQ}{J},$$

wherein the $\Delta_2$ is the second slope, the MaxTQ is maximum torque that the torque source outputs in a current running state, and the J is inertia of the input shaft of the automatic transmission.

9. The shift control method of claim 6, wherein the third slope is determined by taking into consideration the second slope and a slope of the output shaft speed of the transmission.

10. The shift control method of claim 4, wherein the dividing the initial offset to generate the offset input comprises:
  determining a target time at which shifting is completed based on the initial offset;
  dividing an interval from a time at which the speed control entry condition is satisfied to the target time into a plurality of sub-intervals;
  determining a slope corresponding to the respective sub-intervals; and
  generating the offset input which is changed with the determined slope.

11. The shift control method of claim 10, wherein the plurality of sub-intervals comprise a first sub-interval, a second sub-interval, and a third sub-interval, and
  a first slope corresponding to the first sub-interval is determined by taking into consideration a slope of the speed of the torque source at a time at which the speed control condition is satisfied.

12. The shift control method of claim 11, wherein a second slope corresponding to the second sub-interval is determined by taking into consideration the first slope among values satisfying an equation of $$\Delta_2 \leq \frac{MaxTQ}{J},$$

wherein the $\Delta_2$ is the second slope, the MaxTQ is maximum torque that the torque source outputs in a current running state, and the J is inertia of the input shaft of the automatic transmission.

13. The shift control method of claim 12, wherein a third slope corresponding to the third sub-interval is determined by taking into consideration the second slope and a slope of the output shaft speed of the transmission.

14. The shift control method of claim 4, wherein the determining the target speed of the torque source further comprises:
  determining a difference between the input shaft speed at the target gear stage and the initial offset; and
  adding the interpolated offset input to the difference between the input shaft speed at the target gear stage and the initial offset.

15. The shift control method of claim 1, wherein the performing the speed control of the torque source using the target speed of the torque source comprises:
  determining a difference between the target speed of the torque source and a current speed of the torque source;
  determining feedback control input using the difference between the target speed of the torque source and the current speed of the torque source;
  determining feed-forward input using inertia of an input shaft of the automatic transmission and the target speed of the torque source;
  determining disturbance control input using a nominal inverse model of the torque source and at least one low pass filter based on the current speed of the torque source; and determining a torque command using the feedback control input, the feed-forward control input, and the disturbance control input.

16. The shift control method of claim 15, wherein the nominal inverse model is designed to satisfy an equation of $G_n^{-1}(s)=J\times s$,
wherein, the $G_n^{-1}(s)$ is the nominal inverse model, the J is the inertia of the input shaft of the automatic transmission and wherein the s is a Laplace transformation operator.

17. The shift control method of claim 15, wherein the low pass filter is designed to satisfy an equation of $$Q(s) = \frac{\sum_{g=1}^{m} b_g s^g}{\sum_{h=1}^{n} a_h s^h},$$

wherein the Q(s) is the low pass filter, n is greater than or equal to m, and $a_h$ and $b_g$ are design parameters and designed to satisfy an equation of $|Q(s=jw)|_{w \leq w_m} \approx 1$ at a maximum frequency $w_m$ or lower included in the disturbance and, wherein the s is a Laplace transformation operator.

18. The shift control method of claim 2, wherein the speed control completion condition is satisfied when an equation of $|W_{TS}-W_O \times R_{j-th}| \geq W_2$ is satisfied,
where the $W_{TS}$ is a speed of the torque source, $W_O$ is an output shaft speed of the automatic transmission, $R_{j-th}$ is a gear ratio at a target gear stage, and $W_2$ is a second preset value.

19. The shift control method of claim 18, wherein the speed control completion condition is satisfied when an equation of $|W_{TS}-W_O \times R_{J-th}| \geq W_2$ and an equation of $$\frac{d}{dt}(|W_{rs} - W_o \times R_{j-th}|) \leq W_3$$

are simultaneously satisfied,
where the $W_{TS}$ is a speed of the torque source, $W_O$ is an output shaft speed of the automatic transmission, $R_{j-th}$ is a gear ratio at a target gear stage, $W_2$ is a second preset value, and $W_3$ is a third preset value.

20. A shift control apparatus of an automatic transmission, comprising:
a data detector configured to detect data for a shift control;
a torque source configured to generate torque for operating a vehicle;
a controller executed by a predetermined program to control shifting based on the data; and
an actuator configured to receive a control signal from the controller and configured to control hydraulic pressures applied to respective frictional elements of the automatic transmission,
wherein the controller is configured for determining whether a shift condition is satisfied;
wherein the controller is configured for beginning release of an off-going element and engagement of an on-coming element when the shift condition is satisfied;
wherein the controller is configured for determining whether a speed control entry condition is satisfied while performing the release of the off-going element and the engagement of the on-coming element;
wherein the controller is configured for determining target speed of the torque source when the speed control entry condition is satisfied;
wherein the controller is configured for performing speed control of the torque source using the target speed of the torque source;
wherein the controller is configured for determining whether a speed control completion condition is satisfied while performing the speed control; and
wherein the controller is configured for completing the release of the off-going element and the engagement of the on-coming element when the speed control completion condition is satisfied.

* * * * *